United States Patent
Chalkias et al.

(10) Patent No.: US 12,120,242 B2
(45) Date of Patent: *Oct. 15, 2024

(54) HASH SUBTREES FOR GROUPING COMPONENTS BY COMPONENT TYPE

(71) Applicant: R3 Ltd., London (GB)

(72) Inventors: Konstantinos Chalkias, London (GB); Michael Christopher Hearn, Zurich (CH); Richard John Parker, Esher (GB); Andrius Dagys, London (GB)

(73) Assignee: R3 LTD., London (GB)

( * ) Notice: Subject to any disclaimer, the term of this patent is extended or adjusted under 35 U.S.C. 154(b) by 396 days.

This patent is subject to a terminal disclaimer.

(21) Appl. No.: 17/654,978

(22) Filed: Mar. 15, 2022

(65) Prior Publication Data

US 2022/0278849 A1    Sep. 1, 2022

Related U.S. Application Data

(63) Continuation of application No. 15/720,201, filed on Sep. 29, 2017, now Pat. No. 11,316,696.

(51) Int. Cl.
H04L 9/32       (2006.01)
G06Q 20/38      (2012.01)
(Continued)

(52) U.S. Cl.
CPC ......... *H04L 9/3239* (2013.01); *G06Q 20/381* (2013.01); *H04L 9/0618* (2013.01);
(Continued)

(58) Field of Classification Search
CPC ..... H04L 9/40; H04L 9/32; H04L 9/38; H04L 9/06; H04L 9/3239; H04L 9/0618;
(Continued)

(56) References Cited

U.S. PATENT DOCUMENTS 8,224,935 B1 *  7/2012  Bandopadhyay ..... G06F 9/5072
                                                  709/248
10,389,518 B2   8/2019  Chen et al.
(Continued)

FOREIGN PATENT DOCUMENTS

CA    2731954 A1 *  1/2010  ............ G06F 21/60
WO    2017192007 A2   11/2017

OTHER PUBLICATIONS

Anonymous: "Salt (cryptography)—Wikipedia" Apr. 26, 2014, https://en.wikipedia.org/w/index.php?title=Salt(cryptography)&oldid+605916302. 4 pages.
(Continued)

*Primary Examiner* — Jayesh M Jhaveri
(74) *Attorney, Agent, or Firm* — Perkins Coie LLP

(57) ABSTRACT

A system for generating a hash tree with components grouped by component type is provided. Each non-leaf node of the hash tree has a hash of the hashes of its child nodes, and a leaf node has a hash of a component of the hash tree. The system generates, for each component type, a component subtree for that component type based on the leaf nodes that have hashes of the components of that component type. The system then generates a root subtree of the hash tree based on leaf nodes that are the root nodes of the component subtrees. The combination of the root subtree and the component subtrees form the hash tree.

33 Claims, 18 Drawing Sheets

(51) Int. Cl.
*H04L 9/06* (2006.01)
*H04L 9/40* (2022.01)

(52) U.S. Cl.
CPC ...... *H04L 63/0442* (2013.01); *H04L 63/0876* (2013.01); *G06Q 2220/00* (2013.01); *H04L 9/3213* (2013.01); *H04L 63/0435* (2013.01)

(58) Field of Classification Search
CPC ............. H04L 63/0442; H04L 63/0876; H04L 9/3213; H04L 63/0435; G06Q 20/38
See application file for complete search history.

(56) References Cited

U.S. PATENT DOCUMENTS

| | | | |
|---|---|---|---|
| 11,113,676 | B2 | 9/2021 | Hanke et al. |
| 11,188,977 | B2 | 11/2021 | Youb et al. |
| 11,250,394 | B1* | 2/2022 | Madisetti ........... G06Q 20/3825 |
| 2006/0095763 | A1 | 5/2006 | Iyengar et al. |
| 2009/0037491 | A1* | 2/2009 | Cachin .................... G06F 21/64 |
| 2013/0198854 | A1 | 8/2013 | Erway et al. |
| 2017/0061131 | A1 | 3/2017 | Santos et al. |
| 2017/0344435 | A1 | 11/2017 | Davis |
| 2018/0337787 | A1 | 11/2018 | Uhr et al. |

OTHER PUBLICATIONS

Hammant, Paul "Old-School Merkle Trees Rock! —Dzone Big Data", Sep. 19, 2017, https://dzone.com/articles/old-school-merkle-trees-rock. 5 pages.

Hearn, Mike, "Corda: A distributed ledger," Nov. 29, 2016, https://docs.corda.net/releases/release-M10.1/_static/ordia-technical-whitepaper.pdf. 53 pages.

International Search Report and Written Opinion issued for PCT/GB2018/052734 mailed Dec. 6, 2018, 13 pages.

Nakamoto, Satoshi, "Bitcoin: A Peer-to-Peer Electronic Cash System," http://www.bitcoin.org/bitcoin.pdf, pp. 1-9, Jul. 4, 2010.

* cited by examiner

HASH SUBTREES FOR GROUPING COMPONENTS BY COMPONENT TYPE

CROSS-REFERENCE TO RELATED APPLICATION

This application is a continuation of U.S. patent application Ser. No. 15/720,201 filed on Sep. 29, 2017, which is hereby incorporated by reference in its entirety.

BACKGROUND

The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity, and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its serial number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by the car's vehicle identification number. The account for the car identifies the current owner. The current owner creates a transaction against the account for the car that indicates that the transaction is a transfer of ownership, indicates the public keys (i.e., identity tokens) of the current owner and the next owner, and indicates the identity token of the car. The transaction is signed by the private key of the current owner, and the transaction is evidence that the next owner is now the current owner.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is in Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node or cluster of nodes, for notarization. The notary maintains an UTXO database of unspent transaction outputs or alternatively spent transaction outputs. When a transaction is received, the notary checks the inputs to the transaction against the UTXO database to ensure that the outputs referenced by the inputs have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

A transaction may be identified by a transaction identifier that is a hash of the components of the transaction. The components of a transaction may include the inputs, the outputs, the commands (e.g., for a smart contract), the attachments (e.g., written contract), an identification of a notary, an identification of an oracle (e.g., a service that provides real-time currency exchange rates), a validation time window (e.g., a notary will only notarize a transaction if received during this window) and so on. The transaction identifier of a transaction may be generated by inputting the components of the transaction to a hash function that generates a single hash from the combination of the components. Alternatively, the transaction identifier may be the hash of the root node of a Merkle tree of the components. Such a Merkle tree is a binary hash tree of hashes generated from the components. To generate the Merkle tree for a transaction, a leaf node is generated for each component that includes a hash of that component. Nodes with a zero hash value may be generated to ensure that the hash tree is binary. The next higher-level nodes of the Merkle tree are generated to include a hash of the hashes of a pair of leaf nodes. The process continues at successively higher levels until the root node is generated to include the hash of the transaction. Each party to a transaction may maintain a copy of a Merkle tree for the transaction or just the leaf nodes from which the remainder of the Merkle tree can be generated.

Use of the hash of the root node of a Merkle tree as a transaction identifier has advantages over the use of a single hash generated from the combination of the components. When a notary receives a transaction, it needs to ensure that the inputs are the inputs that the parties agreed upon. To do so, each party may sign the transaction identifier, which is provided to the notary. The notary may first check the signatures of the parties and then confirm that the components can be used to generate the transaction identifier. If this is confirmed, then the notary knows that it was provided with the actual inputs to the transactions. If a single hash is generated for the transaction, then all the components need to be provided to the notary so that the notary can confirm the hash. Some systems may also include a non-validating notary that simply verifies that the inputs have not been spent.

Providing all the components to the notary presents some problems. First, if the components are large, then it may take a long time to send the components to the notary and a large amount of computational resources of the notary to compute the hash of the components. Second, any component that is sent risks being intercepted by unauthorized party. So the more components that are sent, the more likely it is that a component will be intercepted. Third, although a notary is assumed to be trusted, if the notary is compromised and is provided all the components of a transaction, then all the components are subject to being compromised. Fourth, for privacy reasons, the parties to a transaction may not want even a trusted notary to have access to certain confidential components.

The use of the root hash of a Merkle tree as a transaction identifier can help overcome these problems. When a Merkle tree is used, the notary need only be provided with the components (e.g., inputs) of a transaction that the notary needs to perform the notarization and enough hashes of the Merkle tree to generate the root hash. To confirm that the provided components are the components that the parties agreed upon, the notary generates a hash of each component. The notary then uses those hashes along with the provided hashes to generate a root hash and confirms that it matches the signed transaction identifier. As an example, if a transaction has eight components with four input components, then the Merkle tree is generated with the hashes of the four input components as the leftmost leaf nodes. In such a case, the notary need only be provided with the four input components and the hash of the right child node of the root node. To confirm the components, the notary can build a Merkle tree using the four input components and the hash of the right child node. To build the Merkle tree, the notary generates hashes of the four components and builds a hash tree from those four hashes. The notary then generates the hash of the root node of the Merkle tree by generating a hash of the root node of the hash tree and the hash of the right child node sent by the party. If the generated hash matches the transaction identifier, then the notary knows that the input components are the agreed-upon input components.

Similar problems may occur when transactions are provided to entities other than notaries, such as oracles, regulators, taxing authorities, and so on. Transactions, like the one for the sale of an asset, often need to list in the transaction event or time-based information such as currency exchange rates, stock prices, interest rates, and so on that are needed to execute the transaction. To support the need for such information, "oracles" have been developed to confirm that such information is correct. A transaction may be considered to have rules or criteria that need to be checked before the transaction can be executed. For example, a transaction may have rule that the transaction cannot be executed if a currency exchange rate is below a minimum currency exchange rate listed in the transaction. In such a case, the oracle may retrieve the current currency exchange rate. If the current currency exchange rate is not below the minimum currency exchange rate, the oracle may add the current currency exchange rate to the transaction and sign the transaction.

DETAILED DESCRIPTION

A method and system for grouping components by component type in a hash tree (e.g., Merkle tree) is provided. In some embodiments, a component grouping hash tree ("CGHT") system groups components of the same component type within a subtree of the hash tree for that component type. For example, if a transaction includes components with the component types of input, output, command, and attachment, the hash tree of the components, referred to as a "transaction hash tree," includes a component subtree for grouping the input components (referred to as an "input subtree"), a component subtree for grouping the output components (referred to as an "output subtree"), a component subtree for grouping the command components (referred to as a "command subtree"), and a component subtree for grouping the attachment components (referred to as an "attachment subtree"). To generate a hash with the components grouped, the CGHT system generates the component subtree for each component type. To generate a component subtree for a component type, the CGHT system first generates a hash for each component of that component type. The CGHT system then generates a component hash tree for that component type based on the hashes of that component type that will be a component subtree of the transaction hash tree. If the number of components of that component type is not a multiple of two, the CGHT system adds a zero value hash (or other agreed-upon hash value). The component hash trees will be the component subtrees of the transaction hash tree. The CGHT system then generates a "root subtree" for the transaction hash tree. The CGHT system generates the root subtree by generating a hash tree with root nodes of the component subtrees with their hashes as the leaf nodes of the root subtree. The combination of the root subtree and the component subtrees form the transaction hash tree. Although the CGHT system is described primarily in the context of grouping components of a transaction, the CGHT system may be used to group components of collections of other types of data. For example, an automobile manufacturer may create a parts list for a new automobile that is grouped by part type such as engine part, transmission part, seat part, steering part, and so on. The manufacturer may generate a parts hash tree with the parts information as the components of the parts hash tree. As another example, an author of a book may generate a book hash tree with the components being paragraphs that are grouped by the component type of chapter number. The grouping of components of a hash tree may help to identify the types of the components and may help to deserialize a component as the component types of the components in a group are known.

Figure 1A:
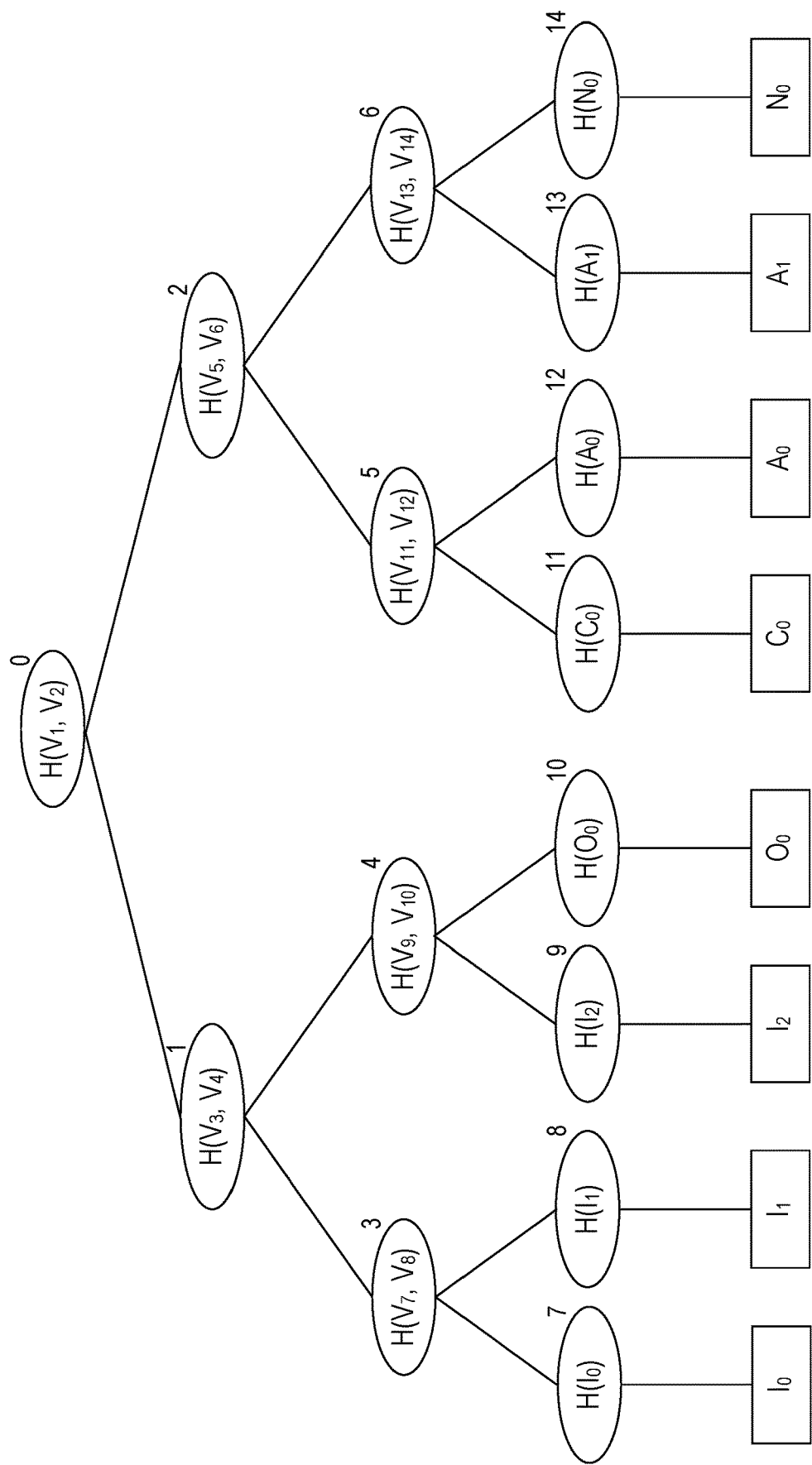
FIG. 1A illustrates a conventional transaction hash tree for a transaction.

The grouping of components by component type in a hash tree also helps in overcoming problems encountered in a conventional hash tree when components are not grouped by component type. FIG. 1A illustrates a conventional transaction hash tree for a transaction. The transaction includes the components of inputs $I_0$, $I_1$, and $I_2$, output $O_0$, command $C_0$, attachments $A_0$ and $A_1$, and notary No. Nodes 7-14 are the leaf nodes of the transaction hash tree and contain the hashes of the corresponding components. In the terminology of Merkle trees, the components would be considered the leaf nodes. As described herein, however, the components are considered part of the hash tree as auxiliary nodes to the leaf nodes. So the term "leaf nodes" refers to the bottommost nodes that contain the hashes of the components. Nodes 3-6 are the next higher-level nodes of the transaction hash tree that contain hashes of pairs of hashes of the leaf nodes. Nodes 1-2 are the next higher-level nodes of the transaction hash tree that contain hashes of pairs of hashes of nodes 3-6. Node 0 is the root node of the transaction hash tree that contains the hash of the hashes of nodes 1-2.

Figure 1B:
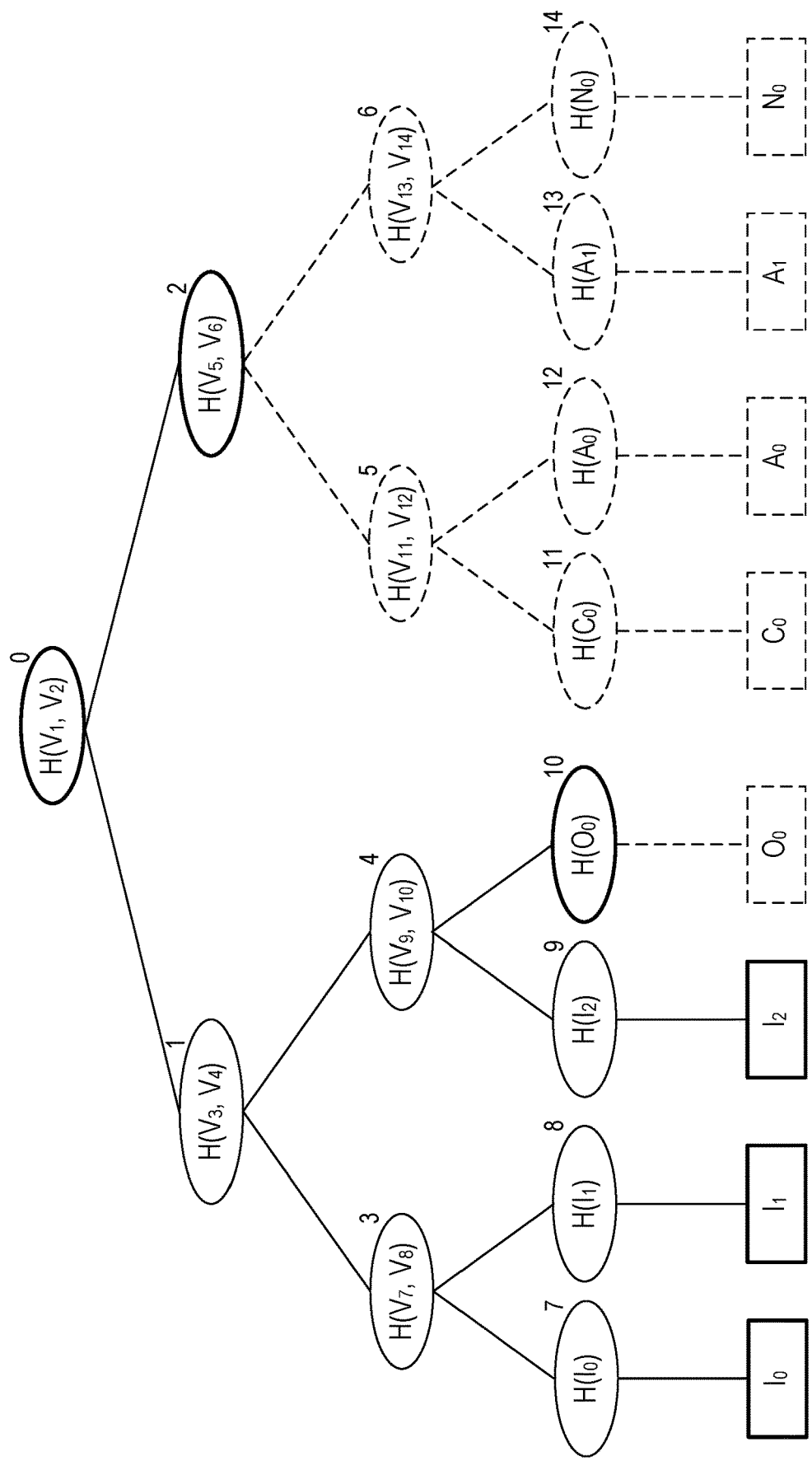
FIG. 1B illustrates a portion of the conventional transaction hash tree of FIG. 1A that is made visible to a notary node.

FIG. 1B illustrates a portion of the conventional transaction hash tree of FIG. 1A that is made visible to a notary node. The nodes highlighted with thick lines are visible, and the nodes highlighted with dashed lines are not visible. So inputs $I_0$, $I_1$, and $I_2$ and nodes 0, 2, and 10 are visible, and output $O_0$, command $C_0$, attachments $A_0$ and $A_1$, and notary $N_0$ and nodes 5-6 are not visible. Node 0 may be visible as the signed transaction identifier of the transaction. Thus, inputs $I_0$, $I_1$, and $I_2$ and nodes 0, 2, and 10 represent the portion of the transaction hash tree that is sent to a notary to notarize the transaction after confirming that the inputs have not yet been spent. Upon receiving the request to notarize the transaction, the notary can confirm that the inputs represent the agreed-upon inputs of the transaction by generating the hashes of each input corresponding to nodes 7-9, the hashes of nodes 3-4 from the hashes of nodes 7-10, the hash of node 1 from the hashes of nodes 3-4, and the hash of node 0 from the hashes of nodes 1-2. If the hash of node 0 matches the signed transaction identifier, then the notary confirms that the inputs are the agreed-upon inputs of the transaction. If the inputs are unspent, then the notary can notarize the transaction.

Figure 1C:
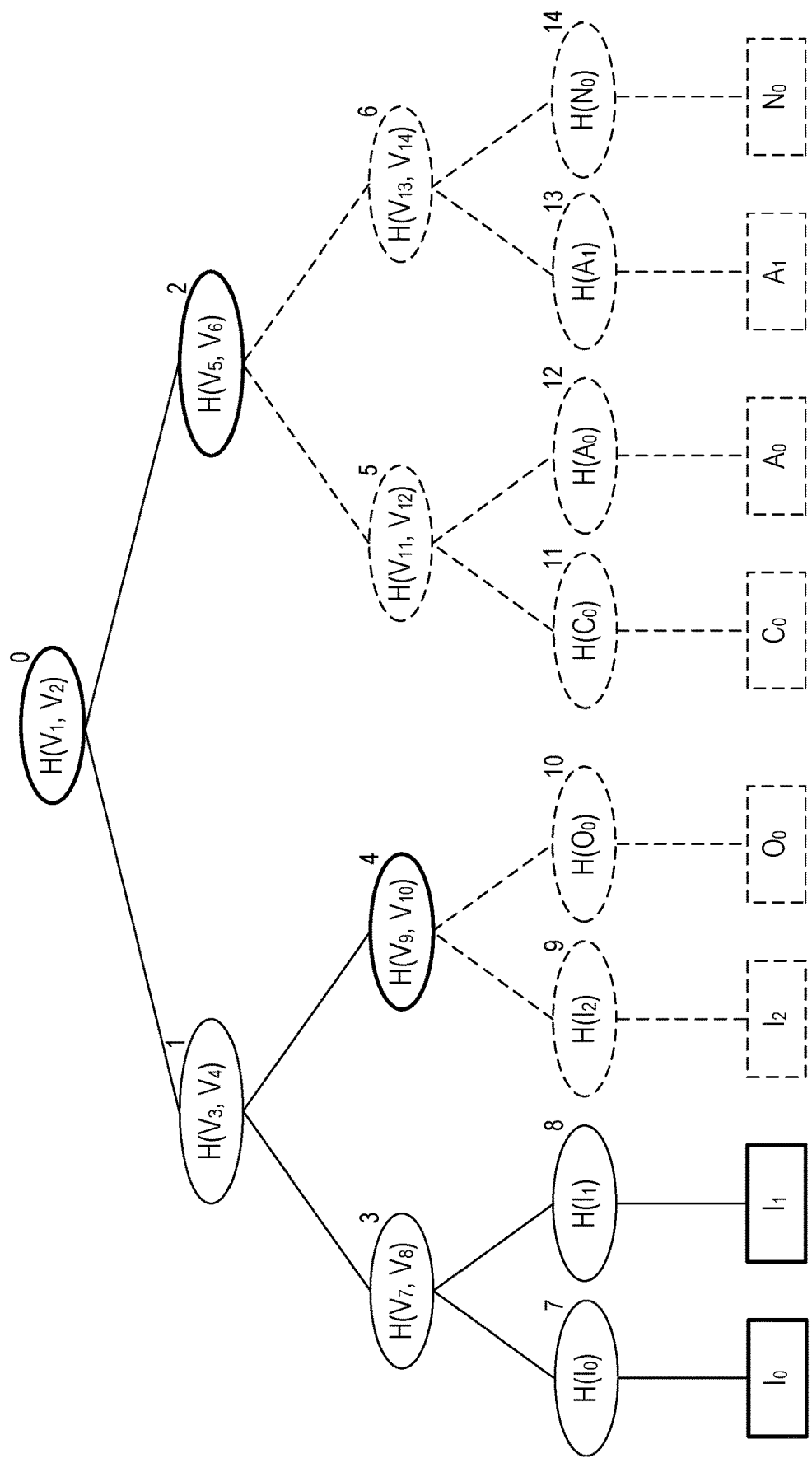
FIG. 1C illustrates a portion of the conventional transaction hash tree of FIG. 1A where an input is hidden from a notary.

FIG. 1C illustrates a portion of the conventional transaction hash tree of FIG. 1A where an input is hidden from a notary. The nodes highlighted with thick lines are visible, and the nodes highlighted with dashed lines are not visible. In this case, the party sending the transaction to the notary decided to send only inputs $I_0$ and $I_1$ and nodes 0, 2, and 4, effectively hiding input $I_2$ from the notary. Upon receiving the request to notarize the transaction, the notary can confirm that the received inputs represent the agreed-upon inputs by generating the hashes of inputs $I_0$ and $I_1$ corresponding to nodes 7-8, the hash of node 3 from the hashes of nodes 7-8, the hash of node 1 from the hashes of nodes 3-4, and the hash of node 0 from the hashes of nodes 1-2. If the hash of node 0 matches the signed transaction identifier, then the notary confirms that the inputs are the agreed-upon inputs. If the inputs are unspent, then the notary can notarize the transaction. However, since the notary did not know about input $I_2$, the notary did not confirm that input $I_2$ was unspent. The party sending the transaction to the notary may have used input $I_2$ to fund a different transaction after the counterparty signed the transaction and thus the transaction was not fully funded. The grouping of components by component type by the CGHT system can help prevent such hiding of components of a transaction.

Figure 2A:
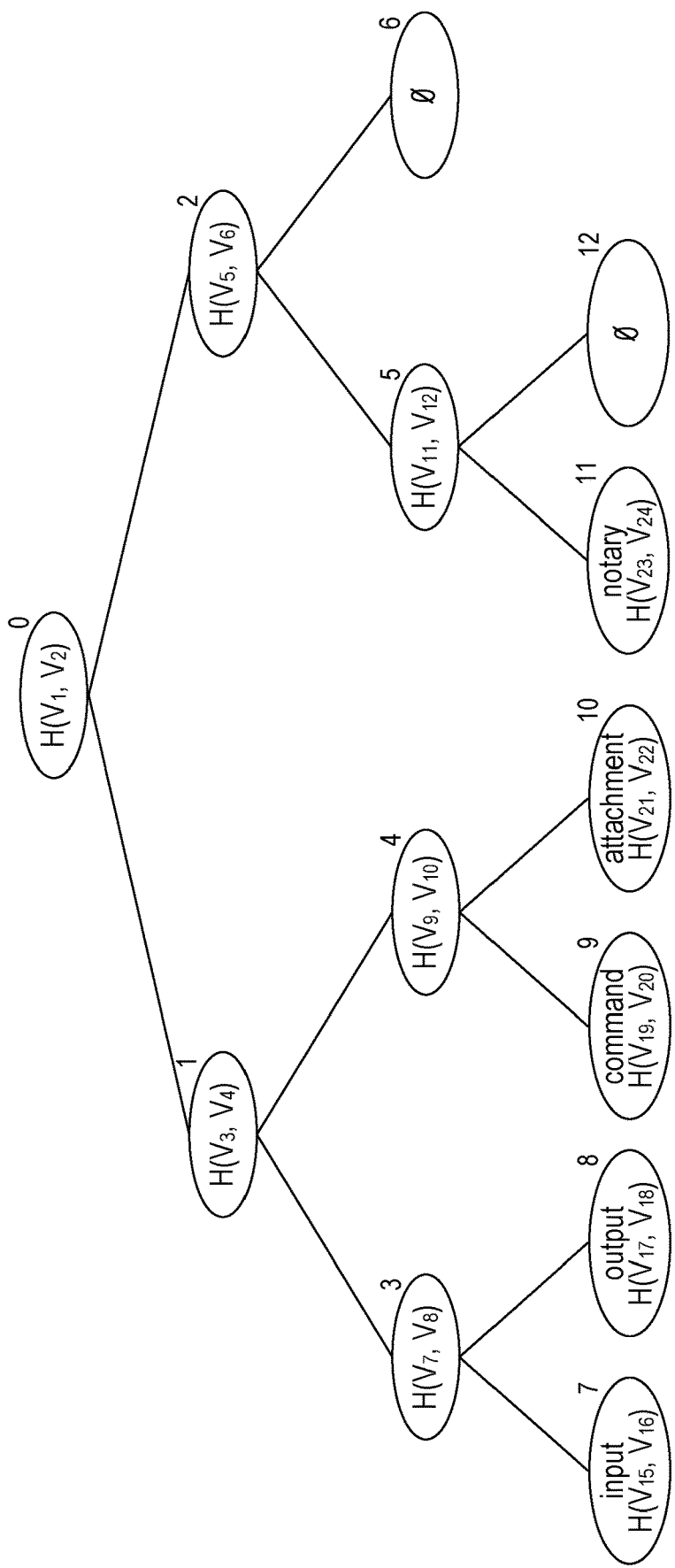
FIGS. 2A-C illustrate sections of the same transaction hash tree with groupings by component type in some embodiments.
Figure 2B:
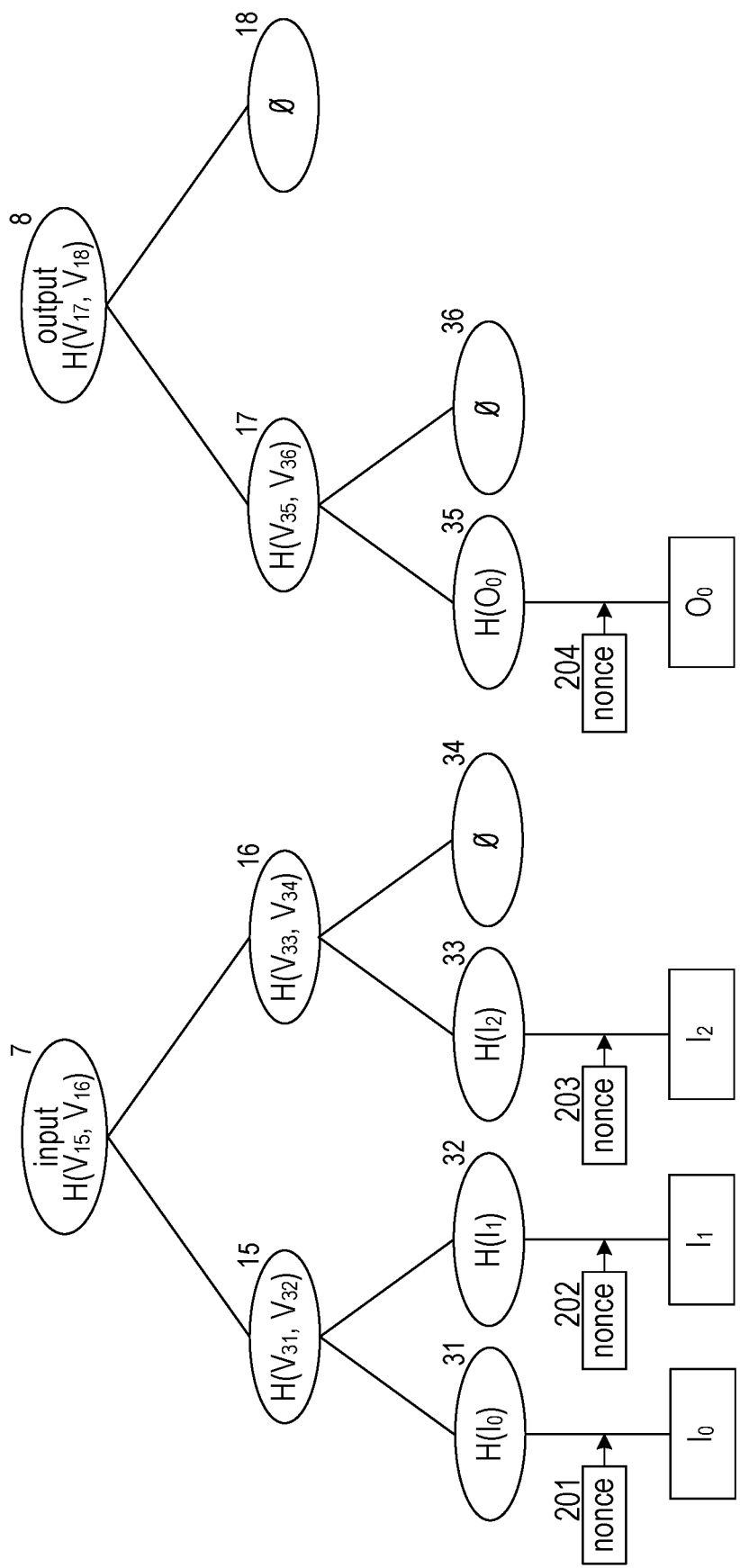
Figure 2C:
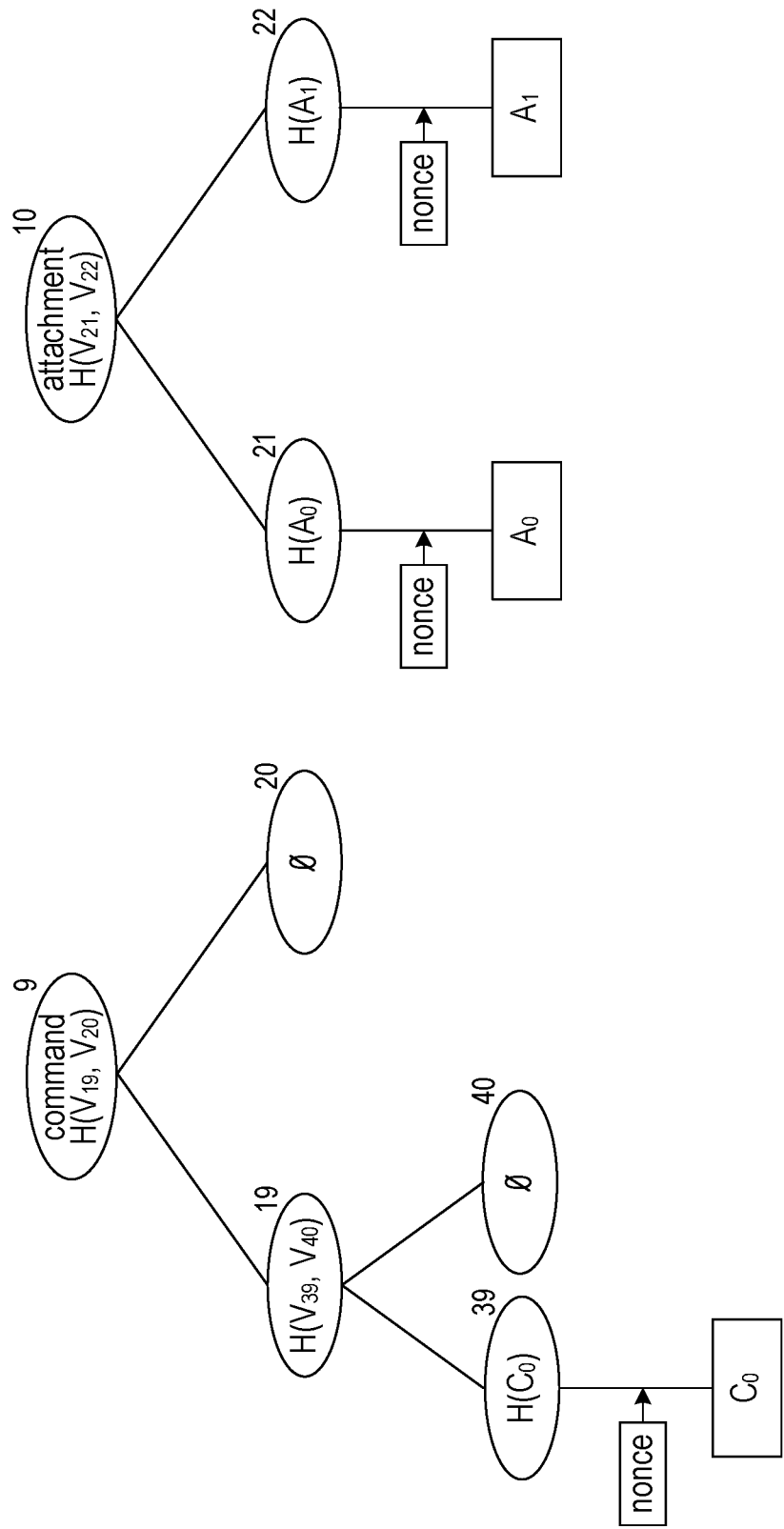

FIGS. 2A-C illustrate sections of the same transaction hash tree with groupings by component type in some embodiments. The components of the transaction hash tree in this example include the components of the component types of input, output, command, attachment, and notary. FIG. 2A illustrates the root subtree of the transaction hash tree. The root subtree is the section of the transaction hash tree from the component nodes up. The nodes 7-11 of the root subtree represent the root nodes of the component subtrees. The nodes 6 and 12 represent nodes added to ensure that each node of the transaction hash trees has two child nodes and may contain a zero hash value ("0"). FIG. 2B illustrates the component subtrees for the input and output component types. The input subtree includes inputs $I_0$, $I_1$, and $I_2$ and nodes 7, 15-16, and 31-34. Nodes 31-33 are the leaf nodes of the transaction hash tree and contain the hash of the corresponding input, and node 34 contains a zero hash value. Node 15 contains a hash of the hashes of nodes 31-32, and node 16 contains the hash of the hashes of nodes 33-34. Node 7 contains the hash of the hashes of nodes 15-16. The output subtree includes output $O_0$ and nodes 8, 17-18, and 35-36. Node 35 contains the hash of the output, and nodes 18 and 36 contain a zero hash value. Node 17 contains a hash of the hashes of nodes 35-36, and node 8 contains the hash of the hashes of nodes 17-18. FIG. 2C illustrates the component subtrees for the command and attachment component types, and the component subtree for the notary is not illustrated.

To prevent a component from being hidden, the CGHT system includes each root node of each component subtree of the transaction hash tree in the portion that is sent to a notary. Alternatively the CGHT system may send the root nodes of only those component subtrees that needs to be visible. In such a case, higher-level nodes would be sent to generate the root hash, and a component of the transaction would indicate which component types have no components. So, in the example of FIGS. 2A-C, the portion would include nodes 7-11. If the only components to be visible to the notary are the inputs, then the portion to be sent to the notary would include inputs $I_0$, $I_1$, and $I_2$ and nodes 0 and 6-12. Alternatively, nodes 2 and 7-11, nodes 5-11, or other combinations of nodes could be sent so long as the hash of the root nodes of the transaction tree can be generated by the notary. Upon receiving the portion, the notary generates the hashes of the inputs as the hashes for nodes 31-33, the hash of node 15 from the hashes of nodes 31-32, the hash of node 16 from the hashes of nodes 33-34 (the notary may use a zero hash value for node 34 because the number of inputs was not a multiple of two), the hash of node 7 from the hashes of nodes 15-16, the hash of node 3 from the hashes of nodes 7-8, the hash of node 4 from the hashes of nodes 9-10, the hash of node 5 from the hashes of nodes 11-12, the hash of node 1 from the hashes of nodes 3-4, the hash of node 2 from the hashes of nodes 5-6, and the hash of node 0 from the hashes of nodes 1-2. If the portion provided to the notary did not include input $I_2$, the notary would generate the hash of node 7 from the hashes of nodes 15-16 with the hash of node 16 being the zero hash value. In such a case, the hash of node 7 would not be correct, and consequently the hash of the root node would not be correct. Thus, the notary would know that either input $I_0$ or $I_1$ or both were not agreed upon or that an agreed-upon input was missing.

In some embodiments, the CGHT system may use a nonce to increase the entropy of each component. The entropy of a component may be low if, for example, the component has a very limited set of possible values. For example, referring to the input subtree of FIG. 2B, if input $I_1$ indicates the day of the week, it may only have the possible values of 0-6. If inputs $I_0$ and $I_2$ are visible and input $I_1$ is not visible, then the portion sent to the notary would include inputs $I_0$ and $I_2$ and nodes 16 and 32. The notary could attempt to guess the value of $I_1$ by generating the hash of each integer in sequence starting with 0. In such a case, the notary would quickly generate a hash that matches the hash of node 32 and thus would have guessed the value of input $I_1$. To help prevent such guessing of inputs, the CGHT system generates a nonce for each component and factors in that nonce when generating the hash for that component. For example, a 128-bit random number may be generated as the nonce for each component and combined with (e.g., added to or concatenated with) the value of that component before generating the hash for that component. Blocks 201-204 of FIG. 2B illustrate the combining of the nonces with the values of the input and output components. When a component is made visible, its nonce is also made visible. Continuing with the example in which inputs $I_0$ and $I_2$ are visible and input $I_1$ is not visible, the portion sent to the notary would include input $I_0$ and its nonce and nodes 16 and 32. The notary can generate the hash of node 31 based on input $I_0$ and its nonce, but it would have a difficult time guessing the value of input $I_1$ because its entropy was effectively increased by factoring in the nonce.

Although the use of a separate nonce for each component can increase the entropy of each component, the use of a random number generator to generate a separate nonce for each component may be computationally very expensive. In some embodiments, to avoid this computational expense, the CGHT system may generate a base nonce, also referred to as a privacy salt, for a transaction hash tree and generate the nonce for each component from that base nonce. For example, a random number generator may be used to generate the base nonce. The nonce for each component may be generated by applying a one-way hash function to the concatenation of the base nonce, the component type of the component (e.g., 0 for input, 1 for output, 2 for command, and so on), and the index of the component of that component (e.g., indicated by the subscripts). The use of a one-way hash function helps ensure that a party receiving a nonce cannot guess the base nonce. Such a separate nonce for each component can be used in a conventional hash tree such as a Merkle tree and is not limited to use in hash trees that group components.

Figure 3:
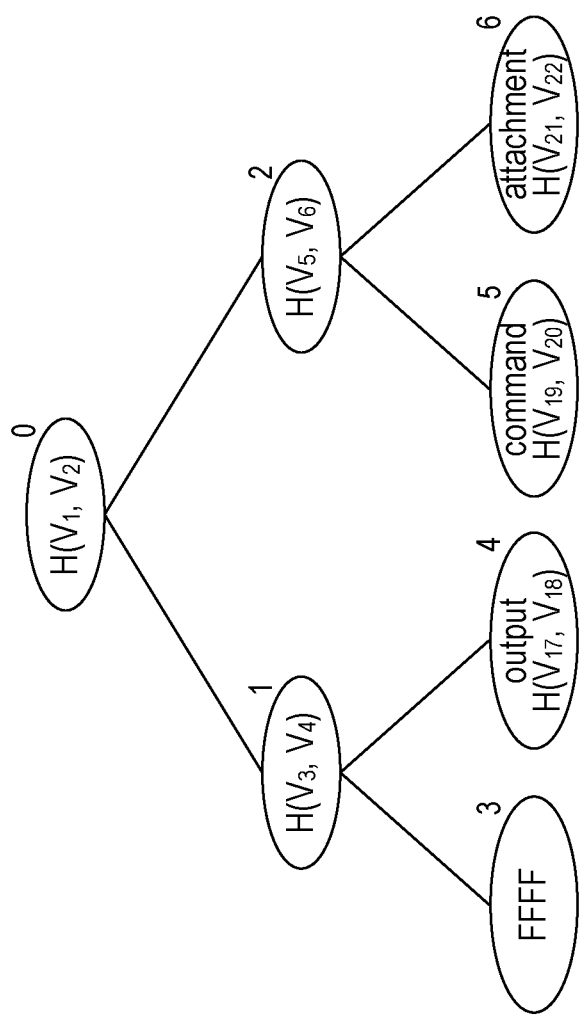
FIG. 3 illustrates a root subtree of a transaction hash tree that does not include an input component.

FIG. 3 illustrates a root subtree of a transaction hash tree that does not include an input component. In some embodiments, the CGHT system may define a fixed ordering for the component types in a transaction hash tree. For example, the input component may be the leftmost component identified by index 0, the output component may be the next component indexed by 1, followed by the command component, the attachment component, the notary component, and so on. To maintain this ordering, the CGHT system includes a node for each component type in a transaction hash tree. Since the transaction of FIG. 3 has no input component, the CGHT system could not generate a hash for the input. In such a case, the CGHT system may use a distinguished value for the hash of the root node of each component subtree for which there are no components. The distinguished value may be a value of all 1's or some other value, but not a zero hash value so that a padding node can be distinguished from a component root node with no child nodes. Thus, node 3, which would be the root node of an input subtree, is illustrated with a hash value of all 1's as represented by the number FFFF in hexadecimal notation. When a notary (or any other entity) receives a portion of the transaction hash tree that includes nodes 3-6, the notary can tell from the distinguished hash value of node 3 that the transaction has no input components. The transaction of FIG. 3 also has no notary component or any other component of a component type that would be to the right of the attachment component. In such a case, the CGHT system may omit nodes with the distinguished hash values for those component types from the transaction hash tree. Upon receiving only nodes 3-6 and verifying that the generated hash for the root node of the transaction hash tree matches the transaction identifier, the notary would know that the transaction did not include any components for the component types that would have a component subtree to the right of the attachment subtree (e.g., component subtrees having an index that is higher than that of the attachment subtree).

Figure 4A:
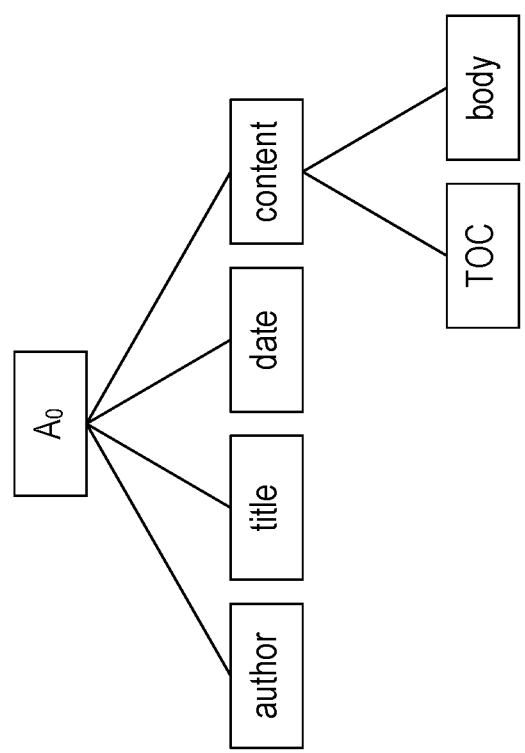
FIGS. 4A-C illustrate a technique for reducing the height of a transaction hash tree.
Figure 4B:
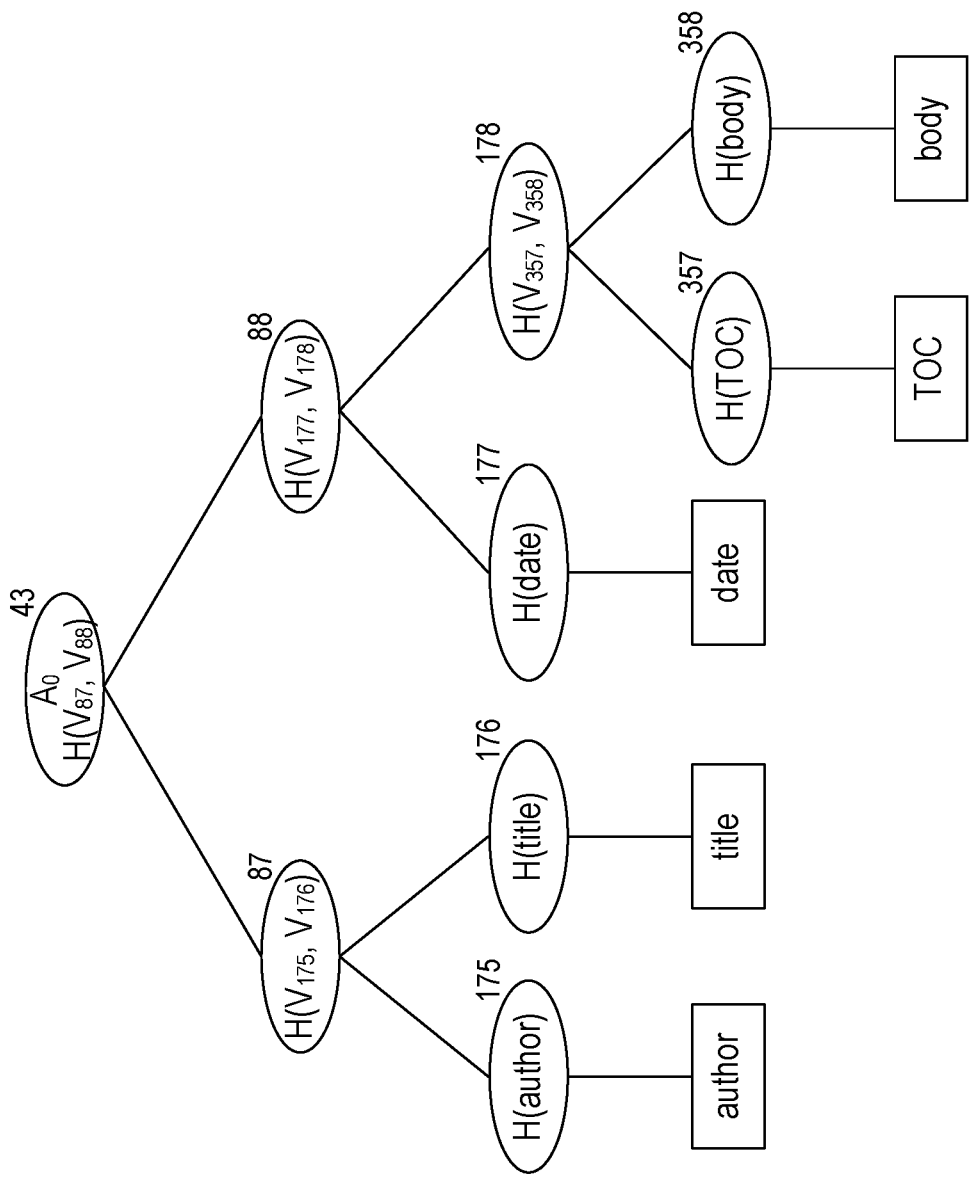
Figure 4C:
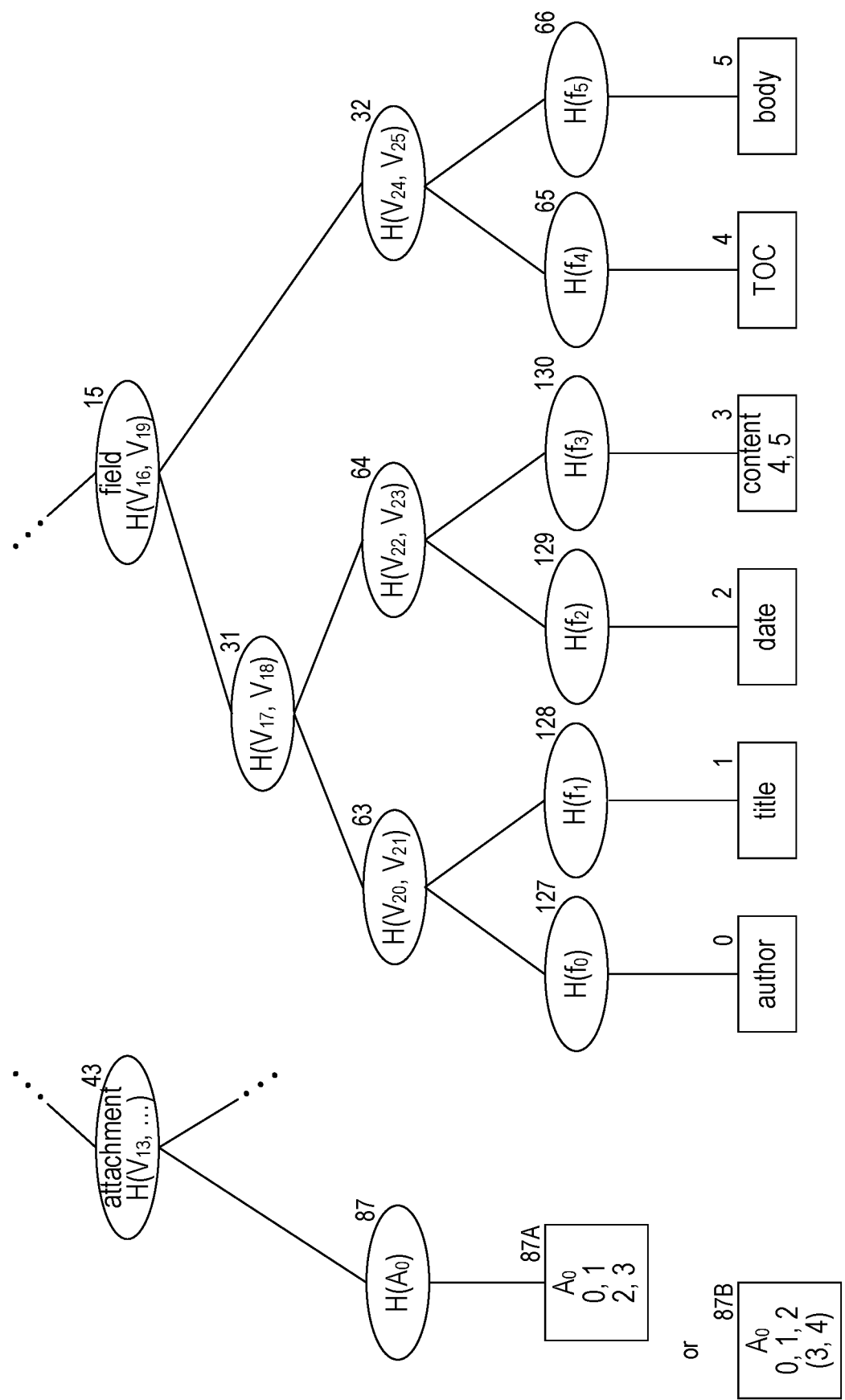

FIGS. 4A-C illustrate a technique for reducing the height of a transaction hash tree. A component of a transaction, such as attachment $A_0$, may have nested subcomponents, also referred to as fields. FIG. 4A illustrates an attachment that is a published article that has an author field, a title field, a date field, and a content field. In addition, the content field itself has the nested subfields of a table of contents ("TOC") and a body. If a party to a transaction wants to make only certain fields or subfields visible, then the transaction hash tree would need a leaf node for each field and subfield. FIG. 4B illustrates a subtree for attachment $A_0$ (corresponding to attachment $A_0$ of FIG. 2C) that includes a leaf node for each field and subfield. If only the table of contents was to be visible, then the portion of the transaction hash tree corresponding to attachment $A_0$ would include the table of contents and nodes 87, 177, and 358. A difficulty with such nesting of fields is that the transaction hash tree can get very deep.

To avoid having transaction hash trees that are deep because of nested fields, the CGHT system flattens out transaction hash trees using a new component type of field. FIG. 4C illustrates the flattening of the transaction hash tree with attachment $A_0$ of FIG. 4A. The CGHT system has created a field component for the author, title, date, content, table of contents, and body, and component 87A references the fields of component $A_0$. The CGHT system generates a field subtree with node 15 as its root node. The field components 0-5 are each included within the field subtree and are indexed from left to right. Component 87A includes an indication that it contains references to fields and the indexes 0, 1, 2, and 3 of the corresponding field components. Field component 3 represents the nested content and includes an indication that it contains references to subfields and the indexes 4 and 5. When accessing a component that contains references, the indexes are used to retrieve the corresponding field component. Continuing with the example above, if only the table of contents was to be visible, then the portion of the transaction hash tree would include the attachment component 87A and field components 3 and 4 and nodes 63, 66, and 129. Attachment component 87B illustrates an alternative approach in which all the fields and subfield references are included in the attachment component, rather than some being included, for example, in the field component 3. In such a case, there would be no field component for the content, and the field components for the table of contents component and the body component would be indexed as 3 and 4. Attachment component 87B would include indexes 0, 1, 2, 3, and 4, with an indication that indexes 3 and 4 are subfields of the same field. The flattening out of hash trees may be used on hash trees in which the components are not grouped. In such a case, the reference to a subfield component may be the node number of the node containing the hash of the subfield component, an indication of the path from the root node of the hash tree to the subfield component (e.g., left child/right child/right child), and so on.

Figure 5:
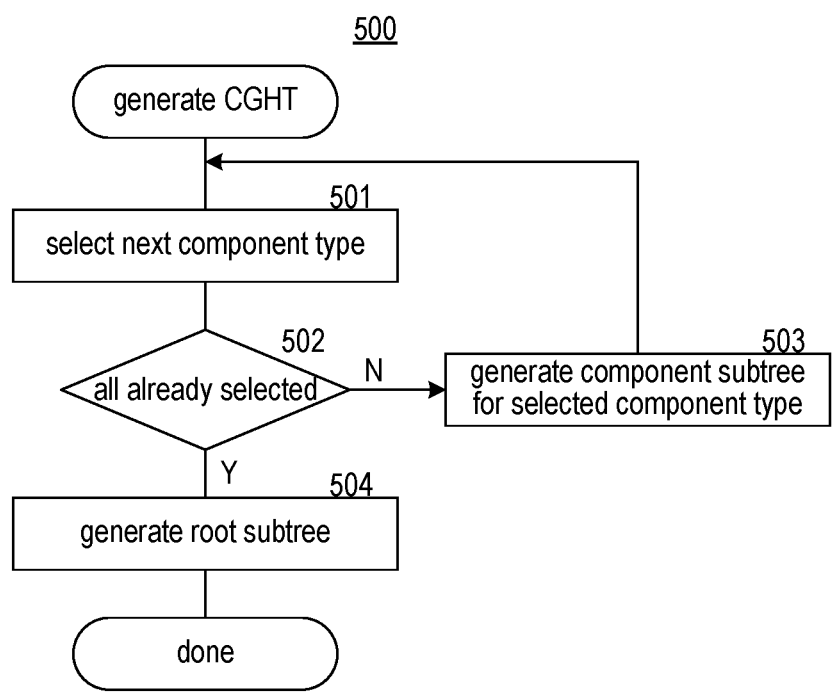
FIG. 5 is a flow diagram that illustrates the overall process of generating a component grouping hash tree in some embodiments.

FIG. 5 is a flow diagram that illustrates the overall process of generating a component grouping hash tree in some embodiments. A module 500 generates a component subtree for each component type from leaf nodes having hashes of the components and then generates a root subtree from leaf nodes that are the root nodes of the component subtrees. The combination of the root subtree and the component subtrees form the hash tree. In block 501, the module selects the next component type. In decision block 502, if all the component types have already been selected, then the module continues at block 504, else the module continues at block 503. In block 503, the module generates the component subtree for the selected component type and then loops to block 501 to select the next component type. In block 504, the module generates a root subtree having leaf nodes that are the nodes of the component subtrees. The module then completes.

Figure 6:
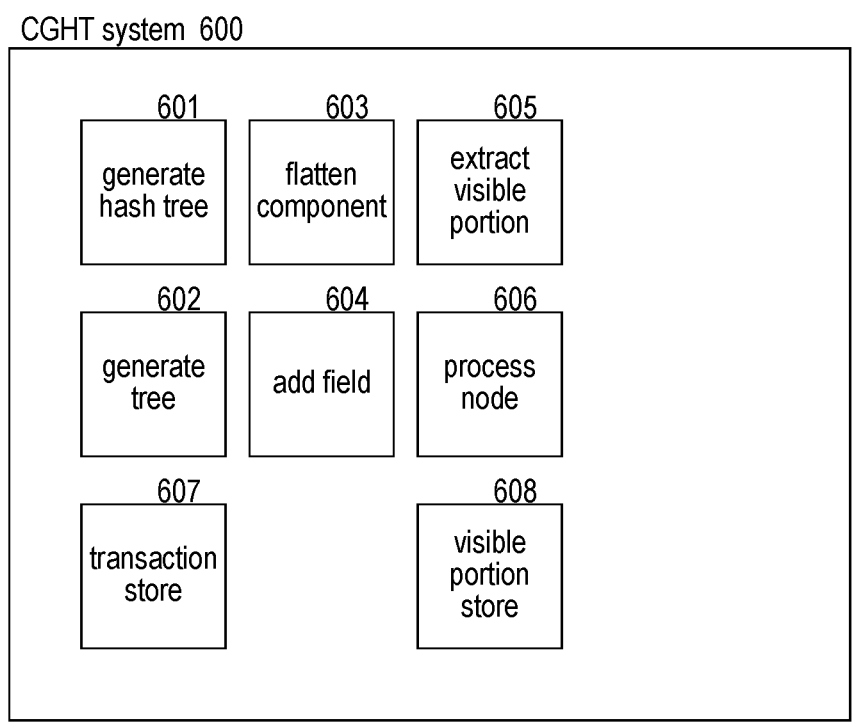
FIG. 6 is a block diagram that illustrates modules and stores of the CGHT system in some embodiments.

FIG. 6 is a block diagram that illustrates modules and stores of the CGHT system in some embodiments. The CGHT system may be included in the decentralized distributed ledger system described in U.S. patent application Ser. No. 15/364,213, entitled "Secure Processing of Electronic Transactions by a Decentralized, Distributed Ledger System," filed on Nov. 29, 2016, which is hereby incorporated by reference. The CGHT system 600 includes a generate hash tree module 601, a generate tree module 602, a flatten component module 603, an add field module 604, an extract visible portion module 605, and a process node module 606. The CGHT system also includes a transaction store 607 and a visible portion store 608. The generate hash tree module is invoked to generate a hash tree and invokes the generate tree module. The flatten component module is invoked to generate a portion of a hash tree for a component that includes fields and invokes the add field module. The extract visible portion module is invoked to extract a visible portion of a hash tree and invokes the process node module. The transaction store stores the transactions of a node including a hash tree for each transaction. The visible portion store stores an extracted visible portion of a hash tree.

The computing systems (e.g., nodes) on which the CGHT system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the CGHT system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The CGHT system may be described in the general context of computer-executable instructions, such as program modules and components, executed by one or more computers, processors, or other devices. Generally, program modules or components include routines, programs, objects, data structures, and so on that perform tasks or implement data types of the CGHT system. Typically, the functionality of the program modules may be combined or distributed as desired in various examples. Aspects of the CGHT system may be implemented in hardware using, for example, an application-specific integrated circuit ("ASIC") or field programmable gate array ("FPGA").

Figure 7:
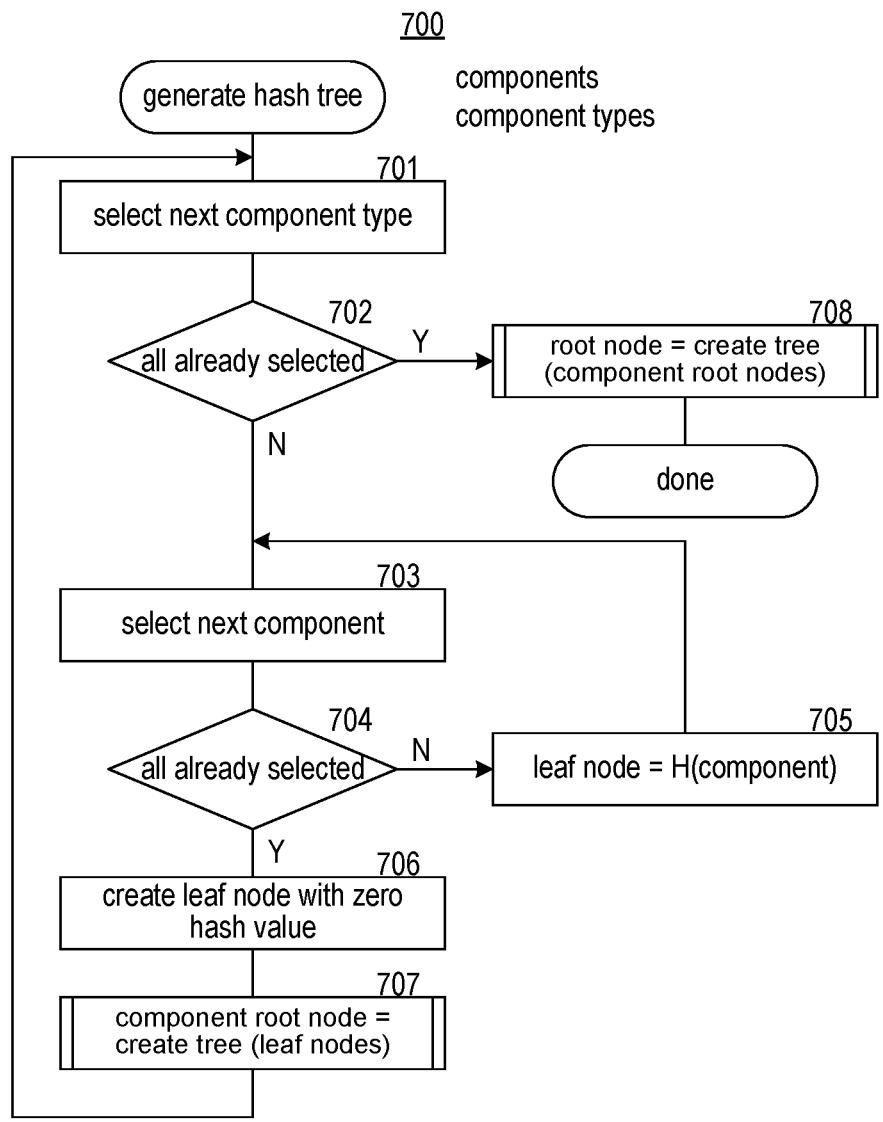
FIG. 7 is a flow diagram that illustrates the processing of a generate hash tree module of the CGHT system in some embodiments.

FIG. 7 is a flow diagram that illustrates the processing of a generate hash tree module of the CGHT system in some embodiments. A generate hash tree module 700 is passed components and their component types and generates a hash tree with the components grouped by component type. In block 701, the module selects the next component type. In decision block 702, if all the component types have already been selected, then the module continues at block 708, else the module continues at block 703. In block 703, the module selects the next component of the selected component type. In decision block 704, if all the components of the selected component type have already been selected, then the module continues at block 706, else the module continues at block 705. In block 705, the module generates a leaf node of the hash tree that includes the hash of the selected component. The module may also generate a nonce, factor that nonce into the generation of the hash of the component, and include the nonce in the hash tree. The module then loops to block 703 to select the next component. In block 706, the module creates a leaf node with a zero hash value when the number of components of the selected component type is odd. In block 707, the module invokes a create tree module passing an indication of the leaf nodes of the selected component type and receives the component subtree generated from the leaf nodes. The module then loops to block 701 to select the next component type. In block 708, the module invokes the create tree module passing an indication of the root nodes of the component subtrees to generate a root subtree with the root nodes of the component subtree as leaf nodes and receives an indication of the root node of the root subtree. The module then completes.

Figure 8:
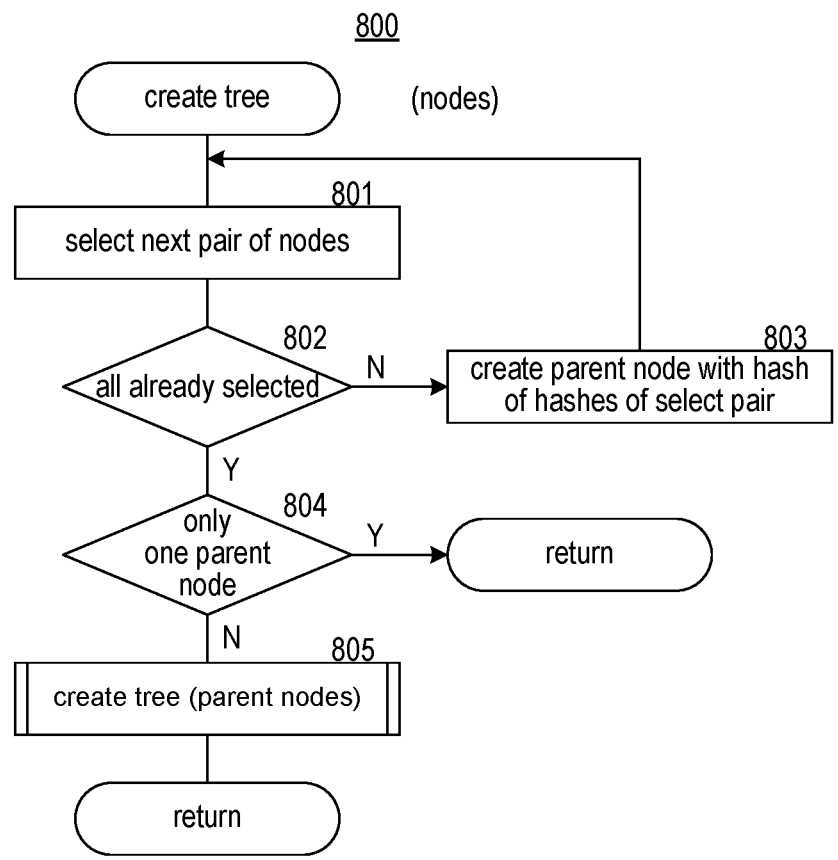
FIG. 8 is a flow diagram that illustrates the processing of a create tree module of the CGHT system in some embodiments.

FIG. 8 is a flow diagram that illustrates the processing of a create tree module of the CGHT system in some embodiments. A create tree module 800 is passed nodes and creates a hash tree with the passed nodes as leaf nodes. In block 801, the module selects the next pair of nodes. In decision block 802, if all the pairs of nodes have already been selected, then the module continues at block 804, else the module continues at block 803. In block 803, the module creates a parent node with a hash of the hashes of the selected pair of nodes. The module then loops to block 801 to select the next pair of nodes. In decision block 804, if only one parent node was generated, then the creation of the hash tree is complete and the module returns, else the module continues at block 805. In block 805, the module invokes the create tree module passing an indication of the parent nodes to create a hash tree with the parent nodes as leaf nodes. The module then returns.

Figure 9:
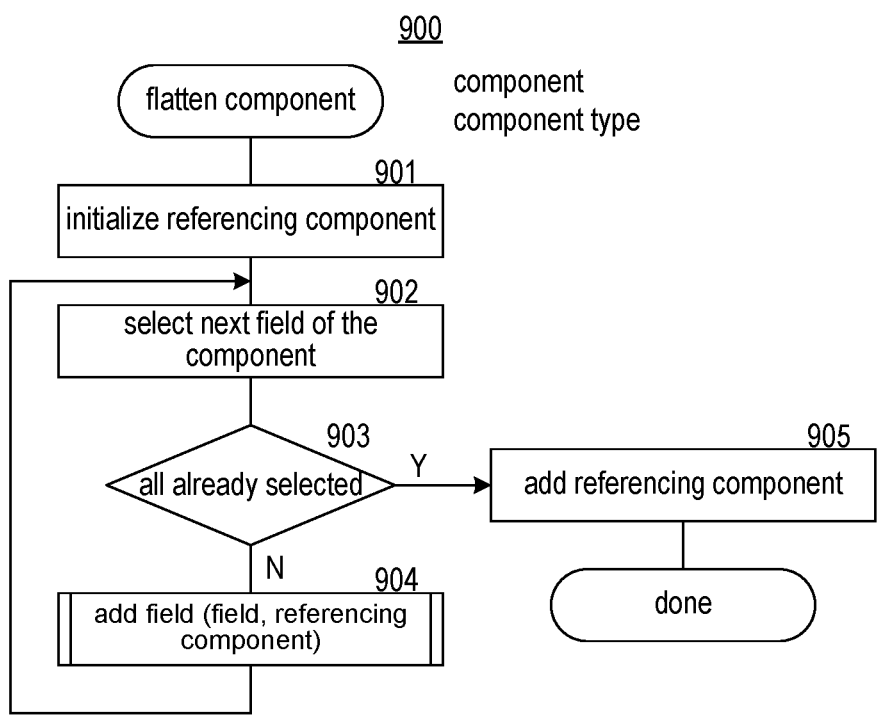
FIG. 9 is a flow diagram that illustrates the processing of a flatten component module of the CGHT system in some embodiments.

FIG. 9 is a flow diagram that illustrates the processing of a flatten component module of the CGHT system in some embodiments. A flatten component module 900 is passed an indication of a component with fields and its component type and generates a portion of the hash tree with that component flattened. In block 901, the module initializes a referencing component of the component type to store references to field components. In block 902, the module selects the next field of the component. In decision block 903, if all the fields have already been selected, then the module continues at block 905, else the module continues at block 904. In block 904, the module invokes the add field module passing an indication of the selected field and the referencing component to add a field component to the hash tree for that component and update the referencing component to include the reference to that field component. The module then loops to block 902 to select the next field of the component. In block 905, the module adds the referencing component in place of the component with the fields and then completes.

Figure 10:
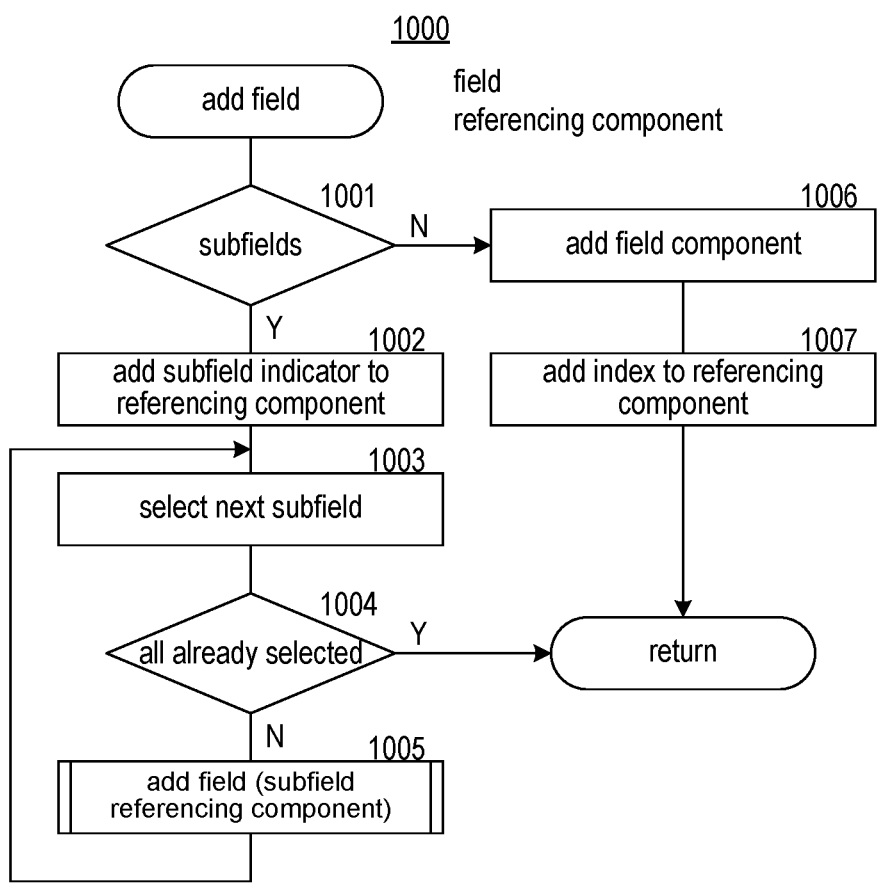
FIG. 10 is a flow diagram that illustrates the processing of an add field module of the CGHT system in some embodiments.

FIG. 10 is a flow diagram that illustrates the processing of an add field module of the CGHT system in some embodiments. An add field module 1000 is passed a field and a referencing component and adds a field component for that field to the hash tree and updates the referencing component with the reference to the field component. In decision block 1001, if the field includes subfields, then the module continues at block 1002, else the module continues at block 1006. In block 1002, the module adds to the referencing component an indicator to indicate that the field has subfields. In block 1003, the module selects the next subfield of the field. In decision block 1004, if all the subfields have already been selected, then the module returns, else the module continues at block 1005. In block 1005, the module invokes the add field component passing an indication of the subfield and the referencing component to add a field component for the subfield to the hash tree and add its reference to the referencing component. The module then loops to block 1003 to select the next subfield. In block 1006, the module adds the field component for the field that has a certain index to the hash tree. In block 1007, the module updates the referencing component with the index and then returns.

Figure 11:
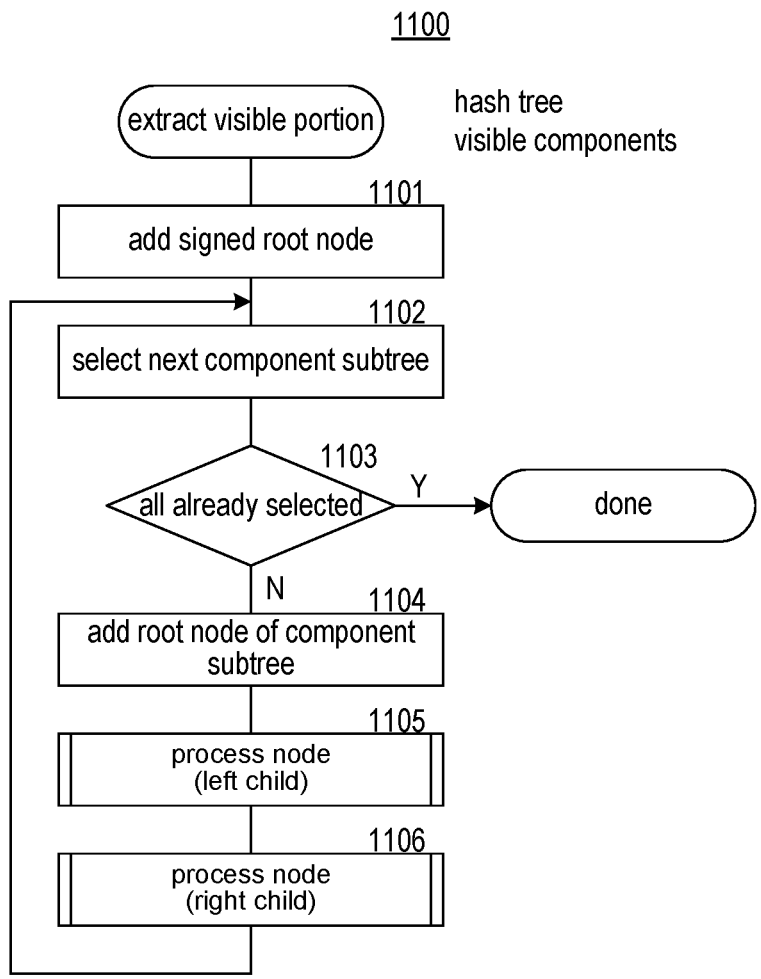
FIG. 11 is a flow diagram that illustrates the processing of an extract visible portion module of the CGHT system in some embodiments.

FIG. 11 is a flow diagram that illustrates the processing of an extract visible portion module of the CGHT system in some embodiments. An extract visible portion module 1100 is passed a hash tree and an indication of the components that are to be made visible and extracts a portion of the hash tree that includes only those components and nodes with hashes that are needed to generate the root hash of the hash tree. In block 1101, the module adds the signed root node to the portion. In block 1102, the module selects the next component subtree of the hash tree. In decision block 1103, if all the component subtrees have already been selected, then the module completes, else the module continues at block 1104. In block 1104, the module adds the root node of the selected component subtree to the portion. In block 1105, the module invokes the process node module passing an indication of the left child node of the root node of the selected component subtree to extract a portion of that subtree if visible. In block 1106, the module invokes the process node module passing an indication of the right child node of the root node of the selected component subtree to extract the portion of that subtree if visible. The module then loops to block 1102 to select the next component subtree.

Figure 12:
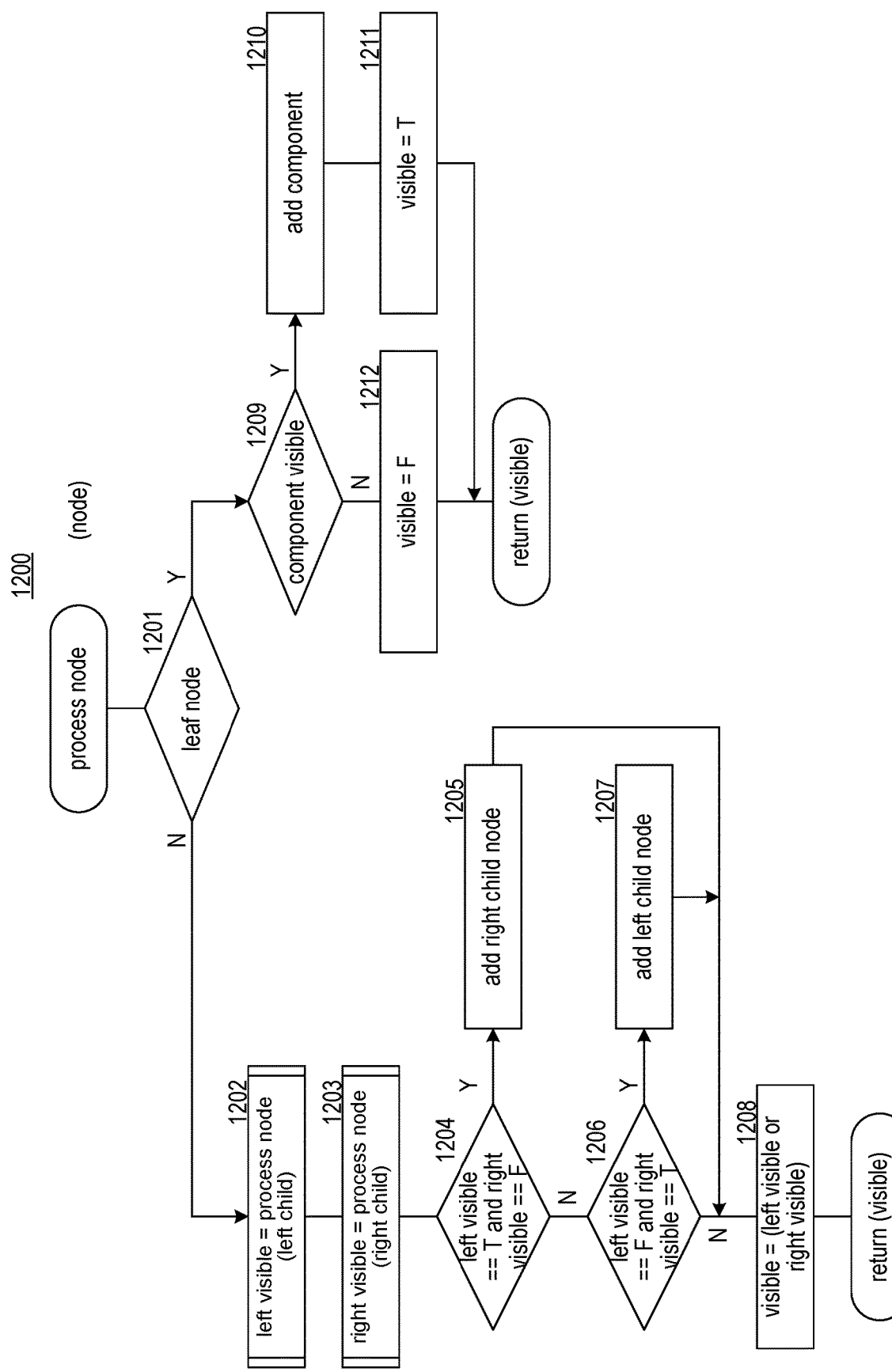
FIG. 12 is a flow diagram that illustrates the processing of a process node module of the CGHT system in some embodiments.

FIG. 12 is a flow diagram that illustrates the processing of a process node module of the CGHT system in some embodiments. A process node module 1200 is passed a node and extracts the portion of the subtree with that node as its root node. In decision block 1201, if the passed node is a leaf node, then the module continues at block 1209, else the module continues at block 1202. In block 1202, the module invokes the process node module passing an indication of the left child node of the passed node and receives a visible flag indicating whether the left child node is visible. In block 1203, the module invokes the process node module passing an indication of the right child node of the passed node and receives a visible flag indicating whether the right child node is visible. In decision block 1204, if the left child node is visible and the right child is not visible, then the module continues at block 1205, else the module continues at block 1206. In block 1205, the module adds the right child node to the portion and continues at block 1208. In decision block 1206, if the left child node is not visible and the right child node is visible, then the module continues at block 1207, else the module continues at block 1208. In block 1207, the module adds the left child node to the portion and continues at block 1208. In block 1208, the module sets a visible flag to true if either the left child node is visible or the right child node is visible. The module then returns the visible flag. In decision block 1209, if the component corresponding to the node is visible, then the module continues at block 1210, else the module continues at block 1212. In block 1210, the module adds the component to the portion along with a nonce if used. In block 1211, the module sets the visible flag to true and returns. In block 1212, module sets the visible flag to false and then returns.

The following paragraphs describe various embodiments of aspects of the CGHT system. An implementation of the CGHT system may employ any combination of the embodiments. The processing described below may be performed by a computing device with a processor that executes computer-executable instructions stored on a computer-readable storage medium that implements the CGHT system.

In some embodiments, a method performed by a computing system for generating a hash tree of nodes having hashes is provided. A non-leaf node has a hash of the hashes of its child nodes, and a leaf node has a hash of a component of the hash tree. The method accesses an indication of components of the hash tree where each component has a component type. For each component type, generates a component subtree for that component type based on the hashes of the components of that component type. The component then generates a root subtree of the hash tree with root nodes of the component subtrees being leaf nodes of the root subtree. In some embodiments, the hash tree is a Merkle tree. In some embodiments, the hash tree has a root node with a root hash and the hash tree represents a transaction with the root hash being an identifier of the transaction. In some embodiments, the component types include input, output, command, attachment, notary, and time window. In some embodiments, the method further extracts a portion of the hash tree that is visible. The extracting adds to the portion each component that is visible and adds to the portion the root node of the hash tree. For each component type, the extracting adds to the portion the root node of the subtree of that component type and adds to the portion the root node of each highest-level subtree of the component subtree of that component type for which each component of that component subtree is not visible. In some embodiments, the method further generates a hash of a component that factors in a nonce. In some embodiments, the method further adds to the portion the nonce for each component that is added to the portion. In some embodiments, the method further generates a hash of a component that factors in a nonce. In some embodiments, each nonce is unique. In some embodiments, the method further generates each nonce from a base nonce. In some embodiments, the generating of each nonce for a component is based on the base nonce and an indicator of the component. In some embodiments, the indicator of the component includes an indicator of the component type of the component and an indicator of the component within the component type. In some embodiments, the method further, when no component of a component type is a component of the hash tree, sets the hash of the root node of a component subtree of that component type to a distinguished value to indicate that no component of that component type is a component of the hash tree. In some embodiments, the method further, when the rightmost component subtrees have no components that are to be included in the hash tree, omits the rightmost component subtrees from the hash tree. In some embodiments, a target component of a target component type includes fields and the method further for each field, generates a field component of a field component type that includes the field. The method also generates a referencing component of the target component type. The referencing component includes a reference to each field component generated for the fields of the target component. The method also includes in the hash tree the field components and the referencing component in place of the target component. In some embodiments, each field component has an index within the field components and the reference to a field component includes the index of the field component for that field. In some embodiments, a target field of the target component includes subfields and the method further generates field components for the subfields, includes the field components for the subfields in the hash tree, and includes in the referencing component a reference to each field component for each subfield in place of a reference to a field component for the target field.

In some embodiments, a method performed by a computing system for generating a hash tree of nodes is provided. A non-leaf node has a hash of the hashes of its child nodes and a leaf node having a hash of a component. When a target component includes fields, the method for each field, generates a target subcomponent that includes the field. The method generates a referencing component that includes a reference to each target subcomponent. The method includes in the hash tree the target subcomponents and the referencing component in place of the target component. In some embodiments, the reference to a target subcomponent includes an identifier of a path from a root node of the hash tree to a leaf node of the hash tree that has the hash of the target subcomponent. In some embodiments, a target field of the target component includes subfields and the method further generates field components for the subfields, includes in the hash tree the field components for the subfields in place of the field component for the target field, and includes in the referencing component a reference to each field component for each subfield in place of the reference to the field component for the target field.

In some embodiments, a computing system is provided that comprises one or more computer-readable storage mediums storing executable instructions and one or more processors for executing the instructions stored in the one or more computer-readable storage mediums. The instructions control the computing system to generate a hash tree of nodes having hashes. A non-leaf node has a hash of the hashes of its child nodes, and a leaf node has a hash of a component of the hash tree. Each component has a component type. The generating of the hash tree, for each component type, generates a component subtree for that component type based on the hashes of the components of that component type. The generating of the hash tree generates a root subtree of the hash tree with root nodes of the component subtrees being leaf nodes of the root subtree. In some embodiments, the hash tree is a Merkle tree. In some embodiments, the instructions further comprise instructions to extract a portion of the hash tree that is to be visible, the extracting comprises adding to the portion each component that is visible and adding to the portion the root node of the hash tree. The extracting further comprises for each component type, adding to the portion the root node of the subtree of that component type and adding to the portion the root node of each highest-level subtree of the component subtree of that component type for which each component of that component subtree is not visible. In some embodiments, the generating of the hash tree further comprises generating a hash of a component that factors in a nonce. In some embodiments, each nonce is generated from a base nonce. In some embodiments, each nonce is generated from a base nonce and an indicator of the component. In some embodiments, the indicator of the component includes an indicator of the component type of the component and an indicator of the component within the component type. In some embodiments, the generating of the hash tree further comprises, when no component of a component type is a component of the hash tree, setting the hash of the root node of the component subtree of that component type to a distinguished value to indicate that no component of that component type is a component of the hash tree. In some embodiments, the generating of the hash tree further comprises, when the rightmost component subtrees have no components of the hash tree, omitting the rightmost component subtrees from the hash tree. In some embodiments, a target component of a target component type includes fields and the generating of the hash tree further comprises for each field, generating a field component of a field component type that includes the field. The generating of the hash tree further comprises generating a referencing component of the target component type. The referencing component includes a reference to each field component generated for the fields of the target component. The generating of the hash tree further comprises including in the hash tree the field components and the referencing component in place of the target component.

In some embodiments, one or more computer-readable storage mediums storing a hash tree is provided. The hash tree comprises components of the hash tree. Each component has a component type. The hash tree comprises for each component type, a component subtree for that component type based on the hashes of the components of that component type. The hash tree comprises a root subtree of the hash tree with root nodes of the component subtrees being leaf nodes of the root subtree. In some embodiments, a target component of a target component type includes fields. The hash tree further comprises for each field, a field component of a field component type that includes the field. The hash tree further comprises a referencing component of the target component type in place of the target component. The referencing component includes a reference to each field component for the fields of the target component. In some embodiments, when no component of a certain component type is a component of the hash tree, the hash of the root node of the component subtree of that certain component type has a distinguished value to indicate that no component of the certain component type is a component of the hash tree. In some embodiments, when the rightmost component subtrees have no components of the hash tree, the hash tree does not include the rightmost component subtrees.

In some embodiments, one or more computer-readable storage mediums storing a portion of a hash tree of nodes having hashes is provided. a non-leaf node has a hash of the hashes of its child nodes. A leaf node has a hash of a component of the hash tree. Each component has a component type. The hash tree includes a component subtree for each component type. The portion comprises each component that is to be visible, a root node of the hash tree, and for each component type, a root node of the component subtree of that component type and a root node of each highest-level subtree of the component subtree of that component type for which each component of that component subtree is not visible.

In some embodiments, a method performed by a computing system for verifying that all components of a component type of a hash tree of nodes are visible in a portion extracted from the hash tree is provided. The hash tree has components grouped by component type, the hash tree has a component root node of a component subtree for the component type.

The method comprises for each component of the component type that is included in the portion, generating a hash of the component and generating a leaf node that indicates the hash of that component. The method generates a component hash tree from the generated leaf nodes. When a root hash of the generated component hash tree matches the component root hash of the component subtree of the portion, the method indicates that all components of the component type are visible in the portion.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for generating a hash tree of nodes having hashes, a non-leaf node having a hash of the hashes of its child nodes and a leaf node having a hash of a component of the hash tree, the method comprising:
   accessing an indication of components of the hash tree, each component from among the components having a component type, wherein the components correspond to a transaction;
   for each component type from among component types of the components, generating a component subtree for the component type based on the hashes of the components of the component type by:
      for each component from among the components of the component type, generating a hash of the component and generating for the component subtree for the component type a leaf node having the hash of the component; and
      adding to the component subtree for the component type the generated leaf nodes and one or more ancestor nodes of the leaf nodes to form the component subtree for the component type; and
   generating a root subtree of the hash tree with root nodes of the component subtrees being leaf nodes of the root subtree by adding to the hash tree one or more ancestor nodes of root nodes of the component subtrees.

2. The method of claim 1 wherein the hash tree is a Merkle tree.

3. The method of claim 1 wherein the hash tree has a root node with a root hash and the hash tree represents a transaction with the root hash being an identifier of the transaction.

4. The method of claim 3 wherein the component types include input, output, command, attachment, notary, and a time window.

5. The method of claim 1 further comprising extracting a portion of the hash tree that is visible by:
   adding to the portion each component that is visible;
   adding to the portion the root node of the hash tree; and
   for each component type,
      adding to the portion the root node of the subtree of that component type; and
      adding to the portion the root node of each highest-level subtree of the component subtree of that component type for which each component of that component subtree is not visible.

6. The method of claim 5 further comprising generating a hash of a component that factors in a nonce.

7. The method of claim 6 further comprising adding to the portion the nonce for each component that is added to the portion.

8. The method of claim 1 further comprising generating a hash of a component that factors in a nonce.

9. The method of claim 8 wherein each nonce is unique.

10. The method of claim 8 further comprising generating each nonce from a base nonce.

11. The method of claim 10 wherein the generating of each nonce for a component is based on the base nonce and an indicator of the component.

12. The method of claim 11 wherein the indicator of the component includes an indicator of the component type of the component and an indicator of the component within the component type.

13. The method of claim 1 further comprising, when no component of a component type is a component of the hash tree, setting the hash of the root node of a component subtree of that component type to a distinguished value to indicate that no component of that component type is a component of the hash tree.

14. The method of claim 1 further comprising, when the one or more rightmost component subtrees have no components that are to be included in the hash tree, omitting the rightmost component subtrees from the hash tree.

15. The method of claim 1 wherein a target component of a target component type includes fields and further comprising:
   for each field, generating a field component of a field component type that includes the field; and
   generating a referencing component of the target component type, the referencing component including a reference to each field component generated for the fields of the target component; and
   including in the hash tree the field components and the referencing component in place of the target component.

16. The method of claim 15 wherein each field component has an index within the field components and the reference to a field component includes the index of the field component for that field.

17. The method of claim 15 wherein a target field of the target component includes subfields and further comprising:
   generating field components for the subfields;
   including the field components for the subfields in the hash tree; and
   including in the referencing component a reference to each field component for each subfield in place of a reference to a field component for the target field.

18. A computing system comprising:
   one or more computer-readable storage mediums storing executable instructions for controlling the computing system to generate a hash tree of nodes having hashes, a non-leaf node having a hash of the hashes of its child nodes and a leaf node having a hash of a component of the hash tree, each component from among components having a component type, wherein the components correspond to a transaction, the generating comprising:
      for each component type from among component types of the components, generating a component subtree for the component type based on the hashes of the components of the component type wherein the component subtree for the component type has leaf nodes that only have the hashes of components of the component type and has ancestor nodes of those leaf nodes; and generating a root subtree of the hash tree with root nodes of the generated component subtrees being leaf nodes of the root subtree by adding to the hash tree ancestor nodes of the root nodes of the component subtrees; and one or more processors for executing the instructions stored in the one or more computer-readable storage mediums.

19. The computing system of claim 18 wherein the hash tree is a Merkle tree.

20. The computing system of claim 18 wherein the instructions further comprise instructions to extract a portion of the hash tree that is to be visible, the extracting comprising:
adding to the portion each component that is visible;
adding to the portion the root node of the hash tree; and
for each component type,
adding to the portion the root node of the subtree of that component type; and
adding to the portion the root node of each highest-level subtree of the component subtree of that component type for which each component of that component subtree is not visible.

21. The computing system of claim 18 wherein the generating further comprises generating a hash of a component that factors in a nonce.

22. The computing system of claim 21 wherein each nonce is generated from a base nonce.

23. The computing system of claim 21 wherein each nonce is generated from a base nonce and an indicator of the component.

24. The computing system of claim 23 wherein the indicator of the component includes an indicator of the component type of the component and an indicator of the component within the component type.

25. The computing system of claim 18 wherein the generating further comprises, when no component of a component type is a component of the hash tree, setting the hash of the root node of the component subtree of that component type to a distinguished value to indicate that no component of that component type is a component of the hash tree.

26. The computing system of claim 18 wherein the generating further comprises, when one or more rightmost component subtrees have no components of the hash tree, omitting the rightmost component subtrees from the hash tree.

27. The computing system of claim 18 wherein a target component of a target component type includes fields and the generating further comprises:
for each field, generating a field component of a field component type that includes the field;
generating a referencing component of the target component type, the referencing component including a reference to each field component generated for the fields of the target component; and
including in the hash tree the field components and the referencing component in place of the target component.

28. One or more computer-readable storage mediums storing executable instructions for generating data structure of a hash tree of nodes having hashes, a non-leaf node having a hash of the hashes of its child nodes and a leaf node having a hash of a component of the hash tree, each component from among components having a component type, wherein the components correspond to a transaction, the generating comprising:

for each component type from among component types of the component, generating a component subtree for the component type based on the hashes of the components of the component type wherein the component subtree for the component type has leaf nodes that only have hashes of components of the component type and as ancestor nodes of those leaf nodes; and generating a root subtree of the hash tree with root nodes of the generated component subtrees being leaf nodes of the root subtree by adding to the hash subtree ancestor nodes of the root nodes of the component subtrees.

29. The one or more computer-readable storage mediums of claim 28 wherein a target component of a target component type includes fields and the hash tree further comprises:
for each field, a field component of a field component type that includes the field; and
a referencing component of the target component type in place of the target component, the referencing component including a reference to each field component for the fields of the target component.

30. The one or more computer-readable storage mediums of claim 28 wherein when no component of a certain component type is a component of the hash tree, the hash of the root node of the component subtree of that certain component type has a distinguished value to indicate that no component of the certain component type is a component of the hash tree.

31. The one or more computer-readable storage mediums of claim 28 wherein when one or more rightmost component subtrees have no components of the hash tree, the hash tree does not include the rightmost component subtrees.

32. One or more computer-readable storage mediums storing executable instructions for generating a portion of a hash tree of nodes having hashes, a non-leaf node having a hash of the hashes of its child nodes and a leaf node having a hash of a component of the hash tree, each component from among components having a component type, wherein the components correspond to a transaction, the hash tree including a component subtree for each component type from among component types of the components, the portion comprising:
each component that is to be visible;
a root node of the hash tree; and
for each component type,
a root node of the component subtree of the component type, that includes, for each component of the component type, a leaf node having a hash of the component and includes ancestor nodes of the leaf nodes, each ancestor node having a hash derived from its child nodes; and
a root node of each highest-level subtree of the component subtree of the component type for which each component of the component subtree is not visible.

33. A method performed by a computing system for verifying that all components from among components, of a component type of a hash tree of nodes are visible in a portion extracted from the hash tree, wherein the components correspond to a transaction, the hash tree having components grouped by component type from among component types of the components, the hash tree having a component root node of a component subtree for the component type, the method comprising:
for each component of the component type that is included in the portion, generating a hash of the component; and generating a leaf node that indicates the hash of that component;

generating a component hash tree from the generated leaf nodes that includes ancestor nodes of the leaf nodes, each ancestor node indicating a hash of its child components; and when a root hash of the generated component hash tree matches a generated component root hash of the component subtree of the portion, indicating that all of the components of the component type are visible in the portion.

\* \* \* \* \*